United States Patent
Kumar et al.

(10) Patent No.: US 10,872,151 B1
(45) Date of Patent: *Dec. 22, 2020

(54) SYSTEM AND METHOD FOR TRIGGERING ANALYSIS OF AN OBJECT FOR MALWARE IN RESPONSE TO MODIFICATION OF THAT OBJECT

(71) Applicant: FireEye, Inc., Milpitas, CA (US)

(72) Inventors: Vineet Kumar, San Jose, CA (US); Alexander Otvagin, Campbell, CA (US); Nikita Borodulin, San Jose, CA (US)

(73) Assignee: FireEye, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/193,231

(22) Filed: Nov. 16, 2018

Related U.S. Application Data

(63) Continuation of application No. 14/985,287, filed on Dec. 30, 2015, now Pat. No. 10,133,866.

(51) Int. Cl.
  *G06F 21/56* (2013.01)
  *G06F 21/55* (2013.01)

(52) U.S. Cl.
  CPC .......... *G06F 21/562* (2013.01); *G06F 21/554* (2013.01); *G06F 21/565* (2013.01)

(58) Field of Classification Search
  CPC ..... G06F 21/562; G06F 21/565; G06F 21/554
  USPC .......................................................... 726/23
  See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

NPL Search Results (Year: 2020).*

(Continued)

*Primary Examiner* — Syed A Zaidi

(57) ABSTRACT

According to one embodiment, a system featuring one or more processors and memory that includes monitoring logic. During operation, the monitoring logic is configured to monitor for and detect a notification message that is directed to a destination other than the monitoring logic and identify an event associated with a change in state of a data store associated with the file system to occur. The notification message, at least in part, triggers a malware analysis to be conducted on an object associated with the state change event.

27 Claims, 5 Drawing Sheets

(56) References Cited

U.S. PATENT DOCUMENTS

| | | | |
|---|---|---|---|
| 6,094,677 | A | 7/2000 | Capek et al. |
| 6,108,799 | A | 8/2000 | Boulay et al. |
| 6,154,844 | A | 11/2000 | Touboul et al. |
| 6,269,330 | B1 | 7/2001 | Cidon et al. |
| 6,272,641 | B1 | 8/2001 | Ji |
| 6,279,113 | B1 | 8/2001 | Vaidya |
| 6,298,445 | B1 | 10/2001 | Shostack et al. |
| 6,357,008 | B1 | 3/2002 | Nachenberg |
| 6,424,627 | B1 | 7/2002 | Sørhaug et al. |
| 6,442,696 | B1 | 8/2002 | Wray et al. |
| 6,484,315 | B1 | 11/2002 | Ziese |
| 6,487,666 | B1 | 11/2002 | Shanklin et al. |
| 6,493,756 | B1 | 12/2002 | O'Brien et al. |
| 6,550,012 | B1 | 4/2003 | Villa et al. |
| 6,577,920 | B1* | 6/2003 | Hypponen ............ G06F 21/564 700/200 |
| 6,775,657 | B1 | 8/2004 | Baker |
| 6,831,893 | B1 | 12/2004 | Ben Nun et al. |
| 6,832,367 | B1 | 12/2004 | Choi et al. |
| 6,895,550 | B2 | 5/2005 | Kanchirayappa et al. |
| 6,898,632 | B2 | 5/2005 | Gordy et al. |
| 6,907,396 | B1 | 6/2005 | Muttik et al. |
| 6,941,348 | B2 | 9/2005 | Petry et al. |
| 6,971,097 | B1 | 11/2005 | Wallman |
| 6,981,279 | B1 | 12/2005 | Arnold et al. |
| 7,007,107 | B1 | 2/2006 | Ivchenko et al. |
| 7,028,179 | B2 | 4/2006 | Anderson et al. |
| 7,043,757 | B2 | 5/2006 | Hoefelmeyer et al. |
| 7,058,822 | B2 | 6/2006 | Edery et al. |
| 7,069,316 | B1 | 6/2006 | Gryaznov |
| 7,080,407 | B1 | 7/2006 | Zhao et al. |
| 7,080,408 | B1 | 7/2006 | Pak et al. |
| 7,093,002 | B2 | 8/2006 | Wolff et al. |
| 7,093,239 | B1 | 8/2006 | van der Made |
| 7,096,498 | B2 | 8/2006 | Judge |
| 7,100,201 | B2 | 8/2006 | Izatt |
| 7,107,617 | B2 | 9/2006 | Hursey et al. |
| 7,159,149 | B2 | 1/2007 | Spiegel et al. |
| 7,213,260 | B2 | 5/2007 | Judge |
| 7,231,667 | B2 | 6/2007 | Jordan |
| 7,240,364 | B1 | 7/2007 | Branscomb et al. |
| 7,240,368 | B1 | 7/2007 | Roesch et al. |
| 7,243,371 | B1 | 7/2007 | Kasper et al. |
| 7,249,175 | B1 | 7/2007 | Donaldson |
| 7,287,278 | B2 | 10/2007 | Liang |
| 7,308,716 | B2 | 12/2007 | Danford et al. |
| 7,328,453 | B2 | 2/2008 | Merkle, Jr. et al. |
| 7,346,486 | B2 | 3/2008 | Ivancic et al. |
| 7,356,736 | B2 | 4/2008 | Natvig |
| 7,386,888 | B2 | 6/2008 | Liang et al. |
| 7,392,542 | B2 | 6/2008 | Bucher |
| 7,418,729 | B2 | 8/2008 | Szor |
| 7,428,300 | B1 | 9/2008 | Drew et al. |
| 7,441,272 | B2 | 10/2008 | Durham et al. |
| 7,448,084 | B1 | 11/2008 | Apap et al. |
| 7,458,098 | B2 | 11/2008 | Judge et al. |
| 7,464,404 | B2 | 12/2008 | Carpenter et al. |
| 7,464,407 | B2 | 12/2008 | Nakae et al. |
| 7,467,408 | B1 | 12/2008 | O'Toole, Jr. |
| 7,478,428 | B1 | 1/2009 | Thomlinson |
| 7,480,773 | B1 | 1/2009 | Reed |
| 7,487,543 | B2 | 2/2009 | Arnold et al. |
| 7,496,960 | B1 | 2/2009 | Chen et al. |
| 7,496,961 | B2 | 2/2009 | Zimmer et al. |
| 7,519,990 | B1 | 4/2009 | Xie |
| 7,523,493 | B2 | 4/2009 | Liang et al. |
| 7,530,104 | B1 | 5/2009 | Thrower et al. |
| 7,540,025 | B2 | 5/2009 | Tzadikario |
| 7,546,638 | B2 | 6/2009 | Anderson et al. |
| 7,565,550 | B2 | 7/2009 | Liang et al. |
| 7,568,233 | B1 | 7/2009 | Szor et al. |
| 7,584,455 | B2 | 9/2009 | Ball |
| 7,603,715 | B2 | 10/2009 | Costa et al. |
| 7,607,171 | B1 | 10/2009 | Marsden et al. |
| 7,639,714 | B2 | 12/2009 | Stolfo et al. |
| 7,644,441 | B2 | 1/2010 | Schmid et al. |
| 7,657,419 | B2 | 2/2010 | van der Made |
| 7,676,841 | B2 | 3/2010 | Sobchuk et al. |
| 7,698,548 | B2 | 4/2010 | Shelest et al. |
| 7,707,633 | B2 | 4/2010 | Danford et al. |
| 7,712,136 | B2 | 5/2010 | Sprosts et al. |
| 7,730,011 | B1 | 6/2010 | Deninger et al. |
| 7,739,740 | B1 | 6/2010 | Nachenberg et al. |
| 7,779,463 | B2 | 8/2010 | Stolfo et al. |
| 7,784,097 | B1 | 8/2010 | Stolfo et al. |
| 7,832,008 | B1 | 11/2010 | Kraemer |
| 7,836,502 | B1 | 11/2010 | Zhao et al. |
| 7,849,506 | B1 | 12/2010 | Dansey et al. |
| 7,854,007 | B2 | 12/2010 | Sprosts et al. |
| 7,869,073 | B2 | 1/2011 | Oshima |
| 7,877,803 | B2 | 1/2011 | Enstone et al. |
| 7,904,959 | B2 | 3/2011 | Sidiroglou et al. |
| 7,908,660 | B2 | 3/2011 | Bahl |
| 7,930,738 | B1 | 4/2011 | Petersen |
| 7,937,387 | B2 | 5/2011 | Frazier et al. |
| 7,937,761 | B1 | 5/2011 | Bennett |
| 7,949,849 | B2 | 5/2011 | Lowe et al. |
| 7,996,556 | B2 | 8/2011 | Raghavan et al. |
| 7,996,836 | B1 | 8/2011 | McCorkendale et al. |
| 7,996,904 | B1 | 8/2011 | Chiueh et al. |
| 7,996,905 | B2 | 8/2011 | Arnold et al. |
| 8,006,305 | B2 | 8/2011 | Aziz |
| 8,010,667 | B2 | 8/2011 | Zhang et al. |
| 8,020,206 | B2 | 9/2011 | Hubbard et al. |
| 8,028,338 | B1 | 9/2011 | Schneider et al. |
| 8,042,184 | B1 | 10/2011 | Batenin |
| 8,045,094 | B2 | 10/2011 | Teragawa |
| 8,045,458 | B2 | 10/2011 | Alperovitch et al. |
| 8,055,613 | B1 | 11/2011 | Mu et al. |
| 8,069,484 | B2 | 11/2011 | McMillan et al. |
| 8,087,086 | B1 | 12/2011 | Lai et al. |
| 8,171,553 | B2 | 5/2012 | Aziz et al. |
| 8,176,049 | B2 | 5/2012 | Deninger et al. |
| 8,176,480 | B1 | 5/2012 | Spertus |
| 8,201,246 | B1 | 6/2012 | Wu et al. |
| 8,204,984 | B1 | 6/2012 | Aziz et al. |
| 8,214,905 | B1 | 7/2012 | Doukhvalov et al. |
| 8,220,055 | B1 | 7/2012 | Kennedy |
| 8,225,288 | B2 | 7/2012 | Miller et al. |
| 8,225,373 | B2 | 7/2012 | Kraemer |
| 8,233,882 | B2 | 7/2012 | Rogel |
| 8,234,640 | B1 | 7/2012 | Fitzgerald et al. |
| 8,234,709 | B2 | 7/2012 | Viljoen et al. |
| 8,239,944 | B1 | 8/2012 | Nachenberg et al. |
| 8,260,914 | B1 | 9/2012 | Ranjan |
| 8,266,091 | B1 | 9/2012 | Gubin et al. |
| 8,266,295 | B2 | 9/2012 | Klein et al. |
| 8,286,251 | B2 | 10/2012 | Eker et al. |
| 8,291,499 | B2 | 10/2012 | Aziz et al. |
| 8,307,435 | B1 | 11/2012 | Mann et al. |
| 8,307,443 | B2 | 11/2012 | Wang et al. |
| 8,312,545 | B2 | 11/2012 | Tuvell et al. |
| 8,321,936 | B1 | 11/2012 | Green et al. |
| 8,321,941 | B2 | 11/2012 | Tuvell et al. |
| 8,332,571 | B1 | 12/2012 | Edwards, Sr. |
| 8,365,286 | B2 | 1/2013 | Poston |
| 8,365,297 | B1 | 1/2013 | Parshin et al. |
| 8,370,938 | B1 | 2/2013 | Daswani et al. |
| 8,370,939 | B2 | 2/2013 | Zaitsev et al. |
| 8,375,444 | B2 | 2/2013 | Aziz et al. |
| 8,381,299 | B2 | 2/2013 | Stolfo et al. |
| 8,402,529 | B1 | 3/2013 | Green et al. |
| 8,464,340 | B2 | 6/2013 | Ahn et al. |
| 8,479,174 | B2 | 7/2013 | Chiriac |
| 8,479,276 | B1 | 7/2013 | Vaystikh et al. |
| 8,479,291 | B1 | 7/2013 | Bodke |
| 8,510,827 | B1 | 8/2013 | Leake et al. |
| 8,510,828 | B1 | 8/2013 | Guo et al. |
| 8,510,842 | B2 | 8/2013 | Amit et al. |
| 8,516,478 | B1 | 8/2013 | Edwards et al. |
| 8,516,590 | B1 | 8/2013 | Ranadive et al. |
| 8,516,593 | B2 | 8/2013 | Aziz |
| 8,522,348 | B2 | 8/2013 | Chen et al. |
| 8,528,086 | B1 | 9/2013 | Aziz |

(56) References Cited

U.S. PATENT DOCUMENTS

| | | |
|---|---|---|
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,413,782 B1 | 8/2016 | Adams et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |

(56) References Cited

U.S. PATENT DOCUMENTS

| | | |
|---|---|---|
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116542 A1* | 8/2002 | Tarbotton .......... G06F 21/564 719/318 |
| 2002/0116627 A1 | 8/2002 | Tarbotton et al. |
| 2002/0144156 A1 | 10/2002 | Copeland |
| 2002/0162015 A1* | 10/2002 | Tang ................... G06F 21/565 726/24 |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194415 A1* | 12/2002 | Lindsay ............... G06F 1/263 710/305 |
| 2002/0194490 A1 | 12/2002 | Halperin et al. |
| 2003/0021728 A1 | 1/2003 | Sharpe et al. |
| 2003/0074574 A1* | 4/2003 | Hursey ............... G06F 21/564 726/22 |
| 2003/0074578 A1 | 4/2003 | Ford et al. |
| 2003/0079145 A1* | 4/2003 | Kouznetsov ........... G06F 21/56 726/22 |
| 2003/0084318 A1 | 5/2003 | Schertz |
| 2003/0101381 A1 | 5/2003 | Mateev et al. |
| 2003/0115483 A1 | 6/2003 | Liang |
| 2003/0120952 A1* | 6/2003 | Tarbotton .......... G06F 21/564 726/4 |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0186860 A1 | 9/2004 | Lee et al. |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114406 A1 | 5/2005 | Borthakur et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Glide et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |

(56) References Cited

U.S. PATENT DOCUMENTS

| | | |
|---|---|---|
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0038011 A1* | 2/2009 | Nadathur ............ G06F 21/565 726/24 |
| 2009/0044024 A1 | 2/2009 | Oberheide et al. |
| 2009/0044274 A1 | 2/2009 | Budko et al. |
| 2009/0064332 A1 | 2/2009 | Porras et al. |
| 2009/0077664 A1* | 3/2009 | Hsu ..................... G06F 21/566 726/24 |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |

(56) References Cited

U.S. PATENT DOCUMENTS

| | | |
|---|---|---|
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0296960 A1* | 11/2012 | Kreuzer ............ H04L 67/1097 709/203 |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0363597 A1 | 12/2015 | Levine-Fraiman |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012145066 A1 | 10/2012 |
| WO | 2013/067505 A1 | 5/2013 |

OTHER PUBLICATIONS

Li et al., A VMM-Based System Call Interposition Framework for Program Monitoring, Dec. 2010, IEEE 16th International Conference on Parallel and Distributed Systems, pp. 706-711.

Liljenstam, Michael , et al., "Simulating Realistic Network Traffic for Worm Warning System Design and Testing", Institute for Security Technology studies, Dartmouth College ("Liljenstam"), (Oct. 27, 2003).

Lindorfer, Martina, Clemens Kolbitsch, and Paolo Milani Comparetti. "Detecting environment-sensitive malware." Recent Advances in Intrusion Detection. Springer Berlin Heidelberg, 2011.

Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].

Marchette, David J., "Computer Intrusion Detection and Network Monitoring: A Statistical Viewpoint", ("Marchette"), (2001).

Margolis, P.E. , "Random House Webster's 'Computer & Internet Dictionary 3rd Edition'", ISBN 0375703519, (Dec. 1998).

Moore, D. , et al., "Internet Quarantine: Requirements for Containing Self-Propagating Code", INFOCOM, vol. 3, (Mar. 30-Apr. 3, 2003), pp. 1901-1910.

Morales, Jose A., et al., "Analyzing and exploiting network behaviors of malware.", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt , "SANDBOXII: Internet", Virus Bulletin Conference, ("Natvig"), (Sep. 2002).

(56) References Cited

OTHER PUBLICATIONS

NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Newsome, J., et al., "Polygraph: Automatically Generating Signatures for Polymorphic Worms", In Proceedings of the IEEE Symposium on Security and Privacy, (May 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.--N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doom, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Spitzner, Lance, "Honeypots: Tracking Hackers", ("Spizner"), (Sep. 17, 2002).
The Sniffers's Guide to Raw Traffic available at: yuba.stanford.edu/.about.casado/pcap/section1.html, (Jan. 6, 2014).
Thomas H. Ptacek, and Timothy N. Newsham, "Insertion, Evasion, and Denial of Service: Eluding Network Intrusion Detection", Secure Networks, ("Ptacek"), (Jan. 1998).
U.S. Appl. No. 14/985,287, filed Dec. 30, 2015 Advisory Action dated May 3, 2018.
U.S. Appl. No. 14/985,287, filed Dec. 30, 2015 Final Office Action dated Jan. 30, 2018.
U.S. Appl. No. 14/985,287, filed Dec. 30, 2015 Non-Final Office Action dated Jul. 24, 2017.
U.S. Appl. No. 14/985,287, filed Dec. 30, 2015 Notice of Allowance dated Jul. 12, 2018.
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
Venezia, Paul, "NetDetector Captures Intrusions", InfoWorld Issue 27, ("Venezia"), (Jul. 14, 2003).
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.

"Mining Specification of Malicious Behavior"—Jha et al, UCSB, Sep. 2007 https://www.cs.ucsb.edu/about.chris/research/doc/esec07.sub.--mining.pdf-.
"Network Security: NetDetector—Network Intrusion Forensic System (NIFS) Whitepaper", ("NetDetector Whitepaper"), (2003).
"Packet", Microsoft Computer Dictionary, Microsoft Press, (Mar. 2002), 1 page.
"When Virtual is Better Than Real", IEEEXplore Digital Library, available at, http://ieeexplore.ieee.org/xpl/articleDetails.iso?reload=true&arnumber=990073, (Dec. 7, 2013).
Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye") (Sep. 2003).
AltaVista Advanced Search Results. "attack vector identifier". Http://www.altavista.com/web/results?ltag=ody&pg=aq&aqmode=aqa=Event+Orch- estrator . . . , (Accessed on Sep. 15, 2009).
AltaVista Advanced Search Results. "Event Orchestrator". Http://www.altavista.com/web/results?ltag=ody&pg=aq&aqmode=aqa=Event+Orch- esrator . . . , (Accessed on Sep. 3, 2009).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlaq Berlin Heidelberg, (2006), pp. 165-184.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Bayer, et al., "Dynamic Analysis of Malicious Code", J Comput Virol, Springer-Verlag, France., (2006), pp. 67-77.
Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cisco, Configuring the Catalyst Switched Port Analyzer (SPAN) ("Cisco"), (1992).
Clark, John, Sylvian Leblanc,and Scott Knight. "Risks associated with usb hardware trojan devices used by insiders." Systems Conference (SysCon), 2011 IEEE International. IEEE, 2011.
Cohen, M.I., "PyFlag—An advanced network forensic framework", Digital investigation 5, Elsevier, (2008), pp. S112-S120.
Costa, M., et al., "Vigilante: End-to-End Containment of Internet Worms", SOSP '05, Association for Computing Machinery, Inc., Brighton U.K., (Oct. 23-26, 2005).
Crandall, J.R., et al., "Minos:Control Data Attack Prevention Orthogonal to Memory Model", 37th International Symposium on Microarchitecture, Portland, Oregon, (Dec. 2004).
Deutsch, P., "Zlib compressed data format specification version 3.3" RFC 1950, (1996).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the

(56) References Cited

OTHER PUBLICATIONS

5th Symposium on Operating Systems Design and Implementation, USENIX Association, ("Dunlap"), (Dec. 9, 2002).
Excerpt regarding First Printing Date for Menke Kaeo, Designing Network Security ("Kaeo"), (2005).
Filiol, Eric , et al., "Combinatorial Optimisation of Worm Propagation on an Unknown Network", International Journal of Computer Science 2.2 (2007).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Hjelmvik, Erik , "Passive Network Security Analysis with NetworkMiner", (IN)Secure, Issue 18, (Oct. 2008), pp. 1-100.
Idika et al., A-Survey-of-Malware-Detection-Techniques, Feb. 2, 2007, Department of Computer Science, Purdue University.

IEEE Xplore Digital Library Sear Results for "detection of unknown computer worms". Http//ieeexplore.ieee.org/searchresult.jsp?SortField=Score&SortOrder=desc- &ResultC . . . , (Accessed on Aug. 28, 2009).
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King") (2003).
Krasnyansky, Max , et al., Universal TUN/TAP driver, available at https://www.kernel.org/doc/Documentation/networking/tuntap.txt (2002) ("Krasnyansky").
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Leading Colleges Select FireEye to Stop Malware-Related Data Breaches, FireEye Inc., 2009.

\* cited by examiner

SYSTEM AND METHOD FOR TRIGGERING ANALYSIS OF AN OBJECT FOR MALWARE IN RESPONSE TO MODIFICATION OF THAT OBJECT

CROSS-REFERENCE TO RELATED APPLICATIONS

This application is a continuation of U.S. application Ser. No. 14/985,287, filed on Dec. 30, 2015, now U.S. Pat. No. 10,133,866, issued Nov. 20, 2018, the entire contents of this application is incorporated by reference herein.

FIELD

Embodiments of the disclosure relate to cyber security. More particularly, embodiments of the disclosure are related to a system and method for triggered analysis of an object for a presence of malware based on an event detected at a file system.

GENERAL BACKGROUND

Over the last decade, file sharing systems that are accessible over the Internet or other publicly accessible networks have been increasingly targeted for malicious attack. One type of malicious attack may involve an attempt, normally through unsuspected uploading of malicious data (e.g., software, data, command(s), etc.) within content stored within a file sharing system, to infect any or all computers that upload the content. The malicious data, generally referred to as "malware," may allow a third party to adversely influence or attack normal operations of the computer where the malicious attack is directed to a vulnerability associated with a specific application (e.g., browser application, document reader application, data processing application, etc.).

For instance, it is recognized that the malicious data may include a program or file that is harmful by design to the computing device. The malicious data may include computer viruses, worms, or any other executable (binary) that gathers or attempts to steal information from the computer, or otherwise operates without permission. The owners of the computers are often unaware that the malicious data has been added to their computers and is in operation.

Various processes and devices have been employed to prevent malicious attacks and other security threats on a file sharing system. Previously, security appliances were placed in-line with a storage server in an attempt to detect malware, in the form of an exploit or some sort of malicious software, as it is being routed into the storage server. However, for that deployment, conventional security appliances were required to understand and process packets configured in accordance with a storage protocol supported by a file system utilized by the storage server, where file system storage protocols are highly divergent. In fact, different types of file system may support different storage protocols and even different storage protocols may be used on different versions of the same type of file system. Additionally, the conventional in-line security appliances caused latency in the retrieval of files or other documents from the storage server. This latency adversely influenced the overall user experience provided by the file sharing system.

In fact, a security appliance offered by FireEye, Inc., the assignee of the present patent application, employs a two-phase malware detection approach to analyze files stored on a file system. This security appliance typically runs an analysis by traversing a storage tree to identify files to scan, and comparing the time of the last scan with the last modification of the file to reduce overhead by limiting its analysis to avoid repeating the scans of files not modified since the prior scanning period. It is noted that the complexity of this type of security appliance greatly increases as the storage volumes increase and storage protocols utilized by the file systems change.

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

Figure 1:
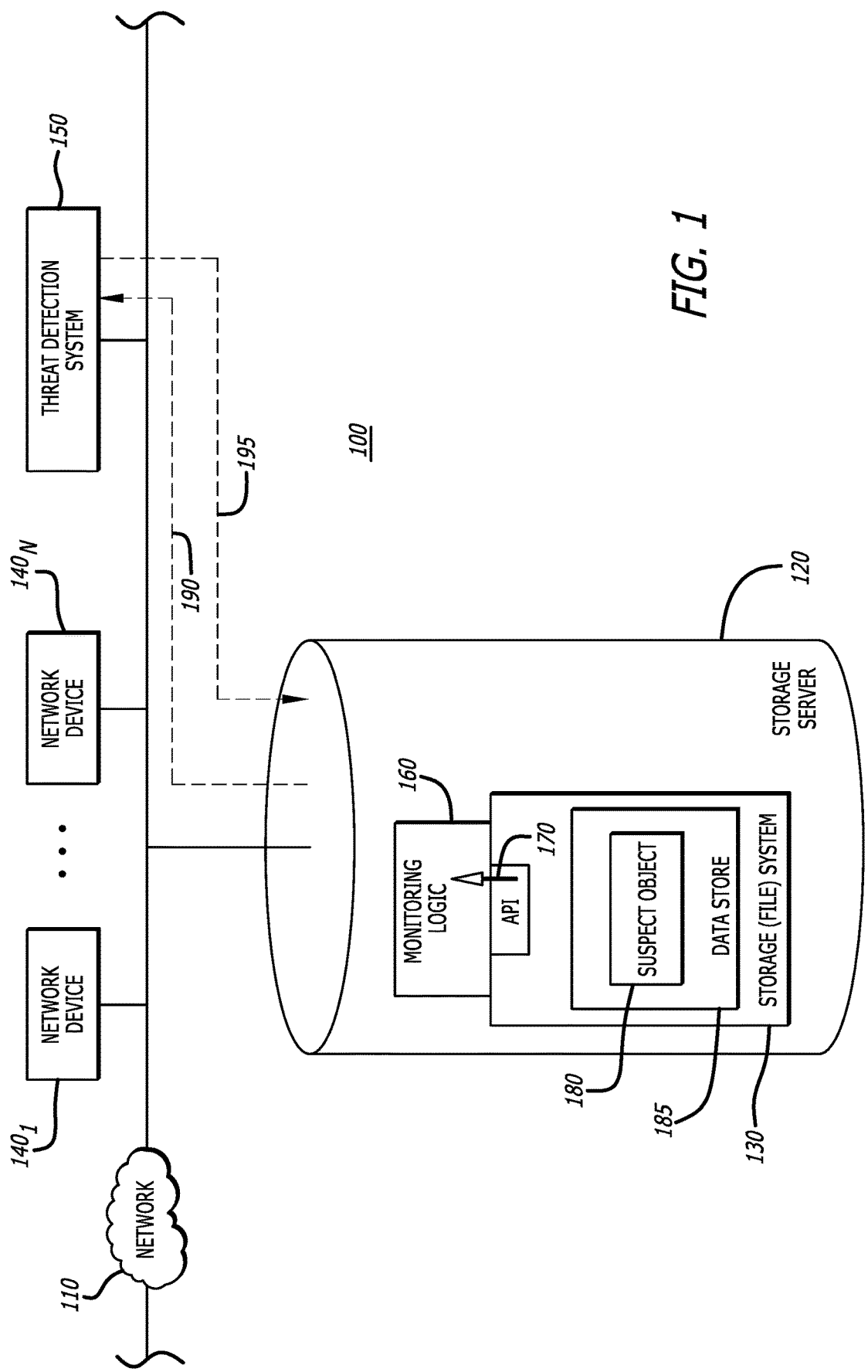
FIG. 1 is an exemplary block diagram of a physical representation of an enterprise network including a storage server that is part of a file system in communication with a threat detection system.

Various embodiments of the disclosure are directed to a threat detection system that takes advantage of notification messages that are issued by many types of conventional storage systems, such as file system or a database system for example, in response to a state change event. A state change event represents a detected activity that caused a change in state of a data store within the storage system. As an example, the state change event can occur in response to a requested modification of a stored object (e.g., file, document, etc.) such as a file being updated and rewritten to the data store. As another example, the state change event can occur in response to a request to store an object into the data store such as a new file being stored within the data store where subsequent retrieval and modification of the new file is controlled by the storage system. For convenience, the storage system may be described in terms of a file system within the description that follows, but the scope of the claims is not necessarily so limited.

According to one embodiment of the disclosure, monitoring logic may be configured to monitor for (sometimes referred to as "hook") signaling issued in response by storage control logic, which may be part of the file system that controls storage and retrieval of objects within a storage server. The signaling may include a notification message that identifies an occurrence of a state change event, where the notification message occurs after completion of the change of state (e.g., file operation). However, it is contemplated that the notification message may occur prior to completion of the change of state, provided that the storage of the object is completed before malware detection analysis is conducted. For instance, the notification message may be prompted in response to receipt of a request message directed to a kernel mode of the storage server to change the state of the object (e.g., add, delete or modify the object in the data store) and/or a response message from the kernel mode of the storage system to indicate that the requested state change has been completed.

Being configured to interact with an Application Programming Interface (API) provided by the storage (file) system, the monitoring logic is able to monitor, using the API, for one or more notification messages that are responsive to particular state change events. In response to detecting a notification message, the monitoring logic extracts an identifier of the object upon which a state change event has occurred (hereinafter referred to as the "suspect object"). The identifier provides information that specifies a unique location of the suspect object within the storage system, where the monitoring logic passes the identifier of the suspect object (and/or additional data associated with the identifier) to the threat detection system. The threat detection system uses the receipt of the identifier as a trigger to obtain the suspect object from the storage (file) system and analyze the suspect object to confirm that the suspect object is free of malware.

Herein, according to one embodiment of the disclosure, the identifier of the suspect object (hereinafter "object identifier") may include a file path (e.g., a pointer to a storage location of the suspect object within the data store of the storage server as assigned by the file system). It is contemplated that, according to this embodiment, the object identifier may be represented as a string of characters separated by a delimiting character (e.g. "/") that represent a directory tree hierarchy as organized by the file system. According to another embodiment of the disclosure, the object identifier may include a unique name assigned to the suspect object (e.g., file name) by the file system.

Stated differently, the malware analysis conducted by the threat detection system may be triggered by receipt of a notification message in response to a state change event (e.g., adding, deleting or modifying a stored object). The notification message may be intercepted, trapped, or monitored, sometimes referred to as "hooked", by the monitoring logic. Upon detecting the notification message (or portions thereof), the monitoring logic identifies the suspect object, namely the object being added, deleted or modified within the storage system. Such identification may be performed by the monitoring logic extracting metadata from the notification message, where the metadata may include the object identifier that identifies a location of the suspect object in the storage server. Representing a location of the suspect object, the object identifier may be in the form of a path to a storage location of the suspect object, name of the suspect object, or the like. The object identifier is provided to the threat protection system that, after receipt, may fetch the object and conduct a static analysis and/or behavioral (dynamic) analysis on the suspect object to determine whether the suspect object is malicious. This static analysis may be conducted by comparing characteristics of the suspect object to known malicious objects (black list) or known benign objects (white list) while the behavioral analysis may be conducted by processing the suspect object, accessed via the object identifier, and determining whether the processing of the suspect object causes any anomalous (unexpected) behaviors to occur.

Furthermore, the monitoring logic may provide information to the threat detection system to initiate a comprehensive alert message that notifies an administrator of the details (e.g., storage location, IP address, object name, etc.) of an object under analysis that is currently stored in the data store of the storage server. Furthermore, the monitoring logic provides a communication path between the storage system and the threat detection system so that, in response to classifying the object under analysis as malicious, the object is removed from the data store or quarantined. Additionally, or in the alternative, the storage (file) system may be configured to substitute the suspect object deemed to be malicious by the threat detection system with a placeholder object (e.g., a text file, etc.). When the placeholder object is subsequently accessed by the electronic device, the placeholder object causes the electronic device processing the placeholder object to generate a notification that warns the user of removal and/or quarantine of the subject object. The warning may include more details about the suspect object (e.g., information regarding the malware type present in the suspect object, contact information for an administrator of the storage system, etc.).

In light of the foregoing, the behavioral analysis of the suspect object is based on and responsive to the "hooked" notification message that is already being issued by the storage control logic that is part of the file system when the suspect object undergoes a change in (storage) state. Additionally, the behavioral analysis may be performed out-of-band instead of on the same path as the request message from the electronic device that is seeking access to the suspect object.

I. Terminology

In the following description, certain terminology is used to describe various features of the invention. For example, the terms "logic," and "engine" may be representative of hardware, firmware or software that is configured to perform one or more functions. As hardware, logic (or engine) may include circuitry having data processing or storage functionality. Examples of such circuitry may include, but are not limited or restricted to a hardware processor (e.g., microprocessor with one or more processor cores, a digital signal processor, any type of programmable gate array, a microcontroller, an application specific integrated circuit "ASIC", etc.), a semiconductor memory, or combinatorial elements.

Logic (or engine) may be software such as one or more processes, one or more instances, Application Programming Interface(s) (API), subroutine(s), function(s), applet(s), servlet(s), routine(s), source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or engine/component) may be stored in persistent storage.

The term "object" generally relates to a collection of data, whether in transit (e.g., over a network) or at rest (e.g., stored), often having a logical structure or organization that enables the object to be classified for purposes of analysis for malware. Examples of different types of objects may include a self-contained file that is separate from or is part of a flow. A "flow" generally refers to related packets that are received, transmitted, or exchanged within a communication session. For convenience, a packet broadly refers to a series of bits or bytes having a prescribed format. The object may correspond to a non-executable or executable file. Examples of a non-executable file may include a document (e.g., a Portable Document Format "PDF" document, word processing document such as Microsoft® Office® document, Microsoft® Excel® spreadsheet, etc.), a downloaded web page, a collection of documents (e.g., a compressed file including two or more documents), or the like. An executable file may be a program that may be made available to an operating system (OS) or an application within the storage server, where an out of the program may be received by a number of electronic devices.

The term "message" generally refers to information placed in a prescribed format. Each message may be in the form of one or more packets, frames, HTTP-based transmissions, a Short Message Service (SMS) text, a Simple Mail Transfer Protocol (SMTP) transmission, or any other series of bits having the prescribed format.

The term "network device" should be generally construed as electronics with data processing capability and/or a capability of connecting to any type of network, such as a public network (e.g., Internet), a private network (e.g., a local area network "LAN", wireless LAN, etc.), or a combination of networks. Examples of a network device may include, but are not limited or restricted to, the following: a security appliance that includes any system or subsystem configured to perform functions associated with malware detection on an incoming object; a server, a mainframe, a firewall, a router; or an endpoint device (e.g., a laptop, a smartphone, a tablet, a desktop computer, a netbook, a medical device, or any general-purpose or special-purpose, user-controlled network device).

According to one embodiment, the term "malware" may be construed broadly as any code or activity that initiates a malicious attack and/or operations associated with anomalous or unwanted behavior. For instance, malware may correspond to a type of malicious computer code that executes an exploit to take advantage of a vulnerability, for example, to harm or co-opt operation of a network device or misappropriate, modify or delete data. Malware may also correspond to an exploit, namely information (e.g., executable code, data, command(s), etc.) that attempts to take advantage of a vulnerability in software and/or an action by a person gaining unauthorized access to one or more areas of a network device to cause the network device to experience undesirable or anomalous behaviors. The undesirable or anomalous behaviors may include a communication-based anomaly or an execution-based anomaly, which, for example, could (1) alter the functionality of a network device executing application software in an atypical manner (a file is opened by a first process where the file is configured to be opened by a second process and not the first process); (2) alter the functionality of the network device executing that application software without any malicious intent; and/or (3) provide unwanted functionality which may be generally acceptable in another context. Additionally, malware may be code that initiates unwanted behavior which may be, as one example, uploading a contact list from an endpoint device to cloud storage without receiving permission from the user.

The term "interconnect" may be construed as a physical or logical communication path between two or more network devices or between different logic (engine/components). For instance, a physical communication path may include wired or wireless transmission mediums. Examples of wired transmission mediums and wireless transmission mediums may include electrical wiring, optical fiber, cable, bus trace, a radio unit that supports radio frequency (RF) signaling, or any other wired/wireless signal transfer mechanism. A logical communication path may include an inter-process communication (IPC) mechanism or other communication mechanism that allows for signaling between different logic.

The term "computerized" generally represents that any corresponding operations are conducted by hardware in combination with software or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

II. General System Architecture

Referring to FIG. 1, an exemplary block diagram of a physical representation of an enterprise network 100 that features a storage server 120, which provides a storage system 130 for controlling the storage and retrieval of objects (e.g., non-executable files). As shown, the enterprise network 100 comprises a network 110 including one or more interconnects that provide connectivity between the storage server 120, one or more network devices $140_1$-$140_N$ (N≥1), and a threat detection system 150.

Herein, the storage system 130 may include, but is not limited or restricted to a file system that allows each of the network devices $140_1$-$140_N$ to store and/or access one or more objects (e.g. files) stored in the storage server 120. Communicatively coupled to or integrated within a portion of the file system 130, monitoring logic 160 is configured to monitor for selected state change events, and in particular a notification message 170 associated with any of the selected state change events. The notification message 170 indicates a change in state of a suspect object 180 that is resides in or is targeted for storage in a data store 185 of the storage server 120 (e.g., modification of a stored file within the data store 185, adding a file for storage within the data store 185 of the storage server 120, deleting a file from the data store 185 of the storage server 120, etc.). According to one embodiment, the monitoring logic 160 may be a plug-in communicatively coupled to an Application Programming Interface (API) associated with the portion of the storage (file) system 130. Of course, it is contemplated that the monitoring logic 160 may be a software component that is different than a plug-in or such functionality may be integrated as part of the file system 130.

In response to detecting the notification message 170, the monitoring logic 160 routes some or all of the data within notification message 170, most notably metadata 190 for identifying a storage location of the suspect object 180 within the storage server 120, to the threat detection system 150. In response to receipt of the metadata 190 (sometimes referred to as the "object identifier" 190), the threat detection system 150 may access the suspect object 180 and conduct static and/or behavioral (dynamic) analysis on some or all of the suspect object 180 to determine whether or not the suspect object 180 has a probability of being associated with a malicious attack that exceeds a prescribed level of probability (e.g., greater than 50%, 70%, 80%, or 90%, etc.).

In the event that the suspect object 180 is determined by the threat detection system 150 to be malicious, the threat detection system 150 may initiate an alert message to an administrator as described below. Furthermore, the threat detection system 150 may return a message 195 to the monitoring logic 160 that identifies the suspect object 180 is malicious. This may cause the storage (e.g., file) system 130 to initiate an operation to remove the suspect object 180 from the data store 185 of the storage server 120 or re-locate the suspect object 180 within the data store 185. Optionally, although not shown, logic within the storage (e.g., file) system 130 may substitute the suspect object 180 with a text object (e.g., file) (not shown) operating as a placeholder. The text file may cause display of a message on a display screen of a network device (e.g., network device 140₁) to identify that the suspect object 180 has been quarantined or removed, and in some cases, information that allows the entity attempting to access the suspect object 180 to contact an administrator.

Figure 2:
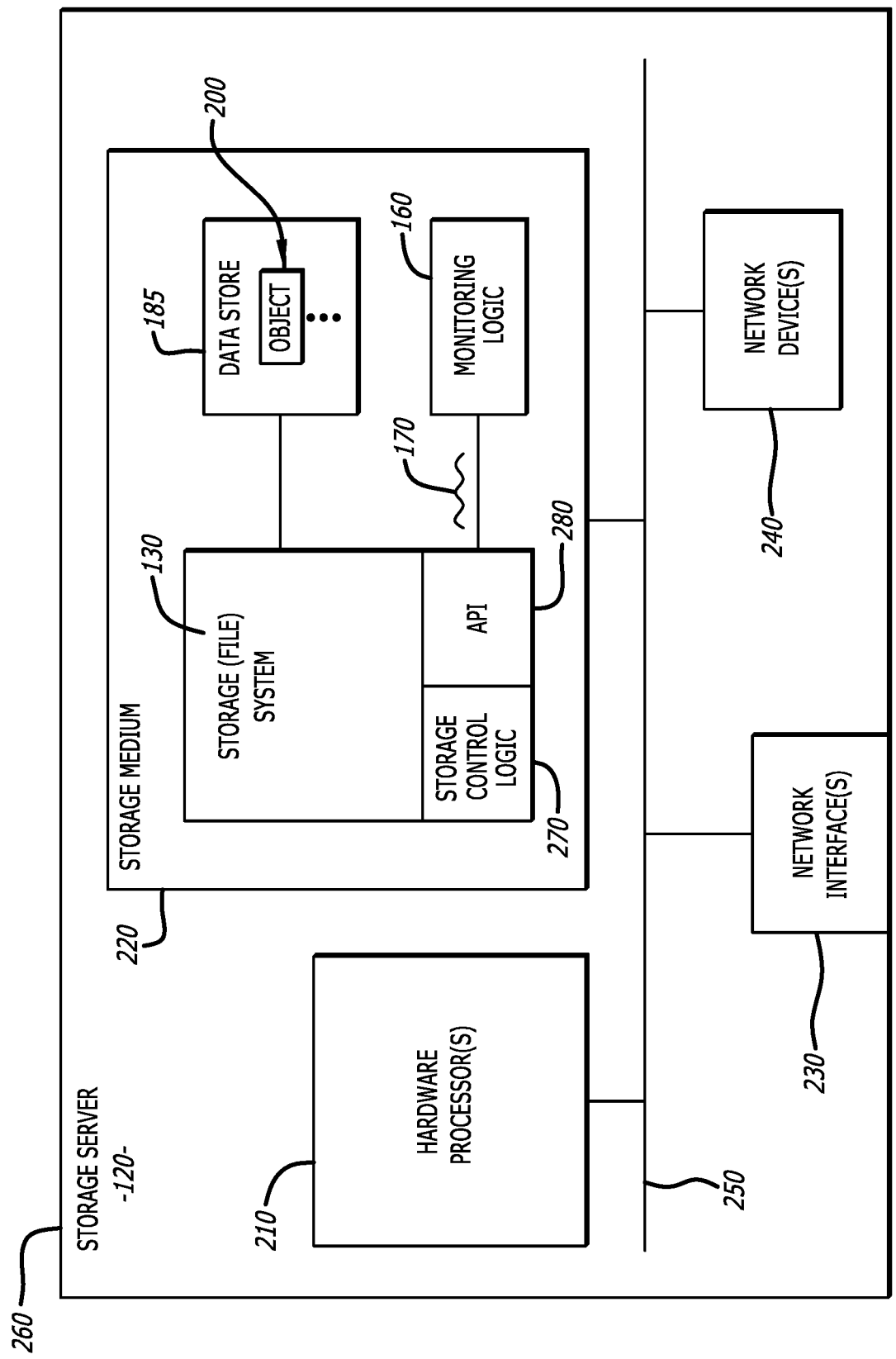
FIG. 2 is an exemplary embodiment of the storage server of FIG. 1.

Referring now to FIG. 2, an exemplary block diagram of a physical representation of a network device (e.g., storage server 120 of FIG. 1) is shown. The storage server 120 is configured with a storage (e.g., file) system 130 that controls storage and retrieval of one or more object(s) 200 (e.g., files), including the suspect object 180 of FIG. 1, within a non-transitory storage medium 220. Herein, the storage server 120 comprises one or more hardware processors (referred to as "processor(s)") 210, the non-transitory storage medium 220, one or more network interfaces (referred to as "network interface(s)") 230, and one or more network devices (referred to as "network device(s)") 240 connected by a system interconnect 250, such as a bus. These components are at least partially encased in a housing 260, which is made entirely or partially of a rigid material (e.g., hardened plastic, metal, glass, composite, or any combination thereof) that protects these components from environmental conditions.

The processor(s) 210 is a multipurpose, programmable component that is configured to accept digital data as input and process the input data in accordance with stored instructions. The input data may include a storage access request message (e.g., file write request, file create request, file delete request, etc.) from an endpoint device controlled by a user. One example of a processor may include an Intel® x86 central processing unit (CPU) with an instruction set architecture. Alternatively, a processor may include another type of CPU, a digital signal processor (DSP), an Application Specific Integrated Circuit (ASIC), a field-programmable gate array (FPGA), or other logic with data processing capability. The processor(s) 210 and the file system 130 within the non-transitory storage medium 220 collectively operate as a system resource that allows for storage and subsequent retrieval of one or more objects 200, such as a non-executable file for example, remotely from the endpoint device (e.g., network device 140₁ of FIG. 1).

The network device(s) 240 may include various input/output (I/O) or peripheral devices, such as a keyboard, key pad, touch screen, or mouse for example. Each network interface 230 may include one or more network ports containing the mechanical, electrical and/or signaling circuitry needed to connect the storage server 120 to network 110 of FIG. 1 (or optionally a network interface card "NIC") thereby facilitate communications to other remotely located network devices 140₁-140ₙ, as shown in FIG. 1. Hence, the network interface(s) 230 may be configured to transmit and/or receive access request messages from network devices 140₁, . . . or, 140ₙ using a variety of communication protocols including, inter alia, Transmission Control Protocol/Internet Protocol (TCP/IP), Hypertext Transfer Protocol (HTTP), HTTP Secure (HTTPS), SMS, iMessage, or the like.

The non-transitory storage medium 220 operates as the data store. From a logical perspective, the non-transitory storage medium 220 includes a plurality of locations that are addressable by the processor(s) 210 and the network interface(s) 230 for storing logic, including monitoring logic 160 communicatively coupled to storage control logic 270 of the file system 130. As deployed, the storage control logic 270 controls the storage and retrieval of object(s) 200 from the non-transitory storage medium 220. The monitoring logic 160 is configured to monitor for signaling that identifies a state change in stored content within the non-transitory storage medium 220, where such signaling includes the notification message 170 that identifies the object that is being added to, deleted from or modified within the storage server 120.

According to one embodiment, as further shown in FIG. 2, the monitoring logic 160 may be a plug-in that is configured to detect the notification message 170 initiated by the storage control logic 270. Herein, the monitoring logic 160 may be implemented as part of the storage (file) system 130 to detect notification messages 170 that is responsive to certain types of state change events conducted on a stored object 200 that is being monitored or may be configured to detect certain selected notification messages via an Application Programming Interface (API) 280, as shown. The API 280 provides the monitoring logic 160 with accessibility to the storage control logic 270 within the kernel mode of the storage server 120 to detect certain changes to the stored object(s) that are initiated by a particular request message from any of network devices 140₁-140ₙ of FIG. 1 being monitored. For instance, the request message may include a write request message (e.g., File Write request) received by the file system 130 from network devices 140₁ of FIG. 1 to update (modify and subsequent storage of) one of the stored object(s) 200. Another request message may include an object addition request message (e.g., Create File request) to add an object (e.g., a non-executable file) for storage within the data store 185 of the storage server 120.

In response to detecting a particular notification message 170 being monitored, the monitoring logic 160 extracts metadata that identifies the object undergoing a state change (herein, "object identifier"), which may identify a file currently stored on the storage server 120 that is being updated or a new file currently being written to (i.e., stored on) the storage server 120. Thereafter, the monitoring logic 160 operates in connection with the network interface(s) 230 to transmit the object identifier to the threat detection system 150 of FIG. 1, where the object identifier may be used by the threat detection system 150 to retrieve the object for conducting behavioral analysis on that object to determine whether the object is associated with a malicious attack. Alternatively, the object identifier may be provided with a copy of that object to the threat detection system 150 in lieu of the "pull" (fetch) mechanism generally described previously.

Figure 3:
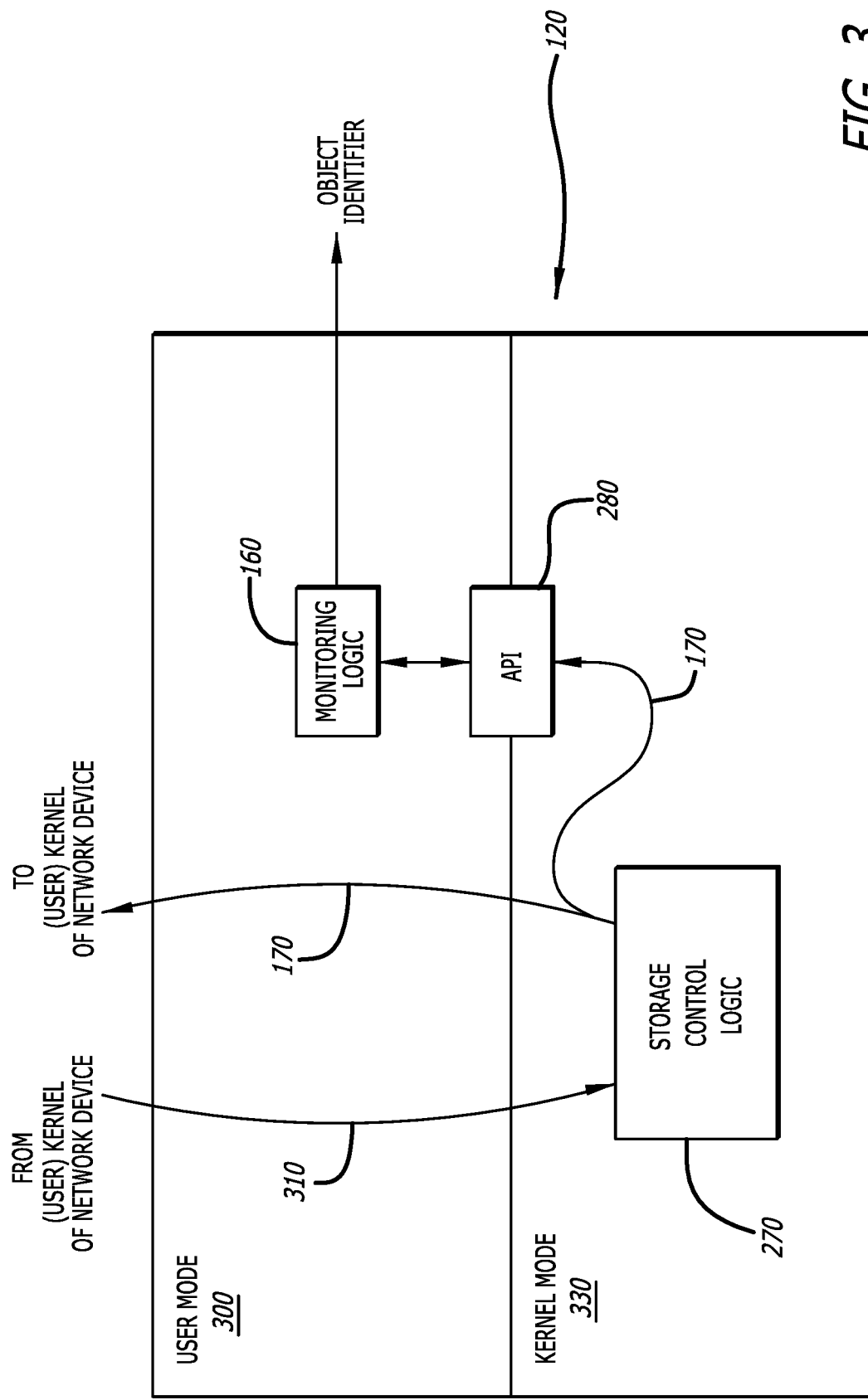
FIG. 3 is an exemplary block diagram of a logical representation of the storage server of FIG. 2.

As shown in FIG. 3, an exemplary block diagram of a logical representation of the storage server 120 of FIG. 2 is shown. Herein, the storage server 120 comprises a user mode 300 and a kernel mode 330. Herein, in user mode 300, an application or other executing code is unable to directly access hardware or reference memory. Rather, the application or other executing code accesses hardware or memory via a system API. In kernel mode, however, a driver or other executing code may have complete and unrestricted access to the underlying hardware. Hence, kernel mode 330 is generally reserved for the lowest-level (highest privileged), most trusted file system functionality such as the storage control logic 270 of FIG. 2. Access by monitoring logic 160 within the user mode 300 to notification messages issued by the storage control logic 270 in response to state change events is provided through the API 280.

Herein, a request message 310 for accessing an object or request an update or storage of the object within the storage server 120 is provided from a kernel mode of the network device accessible to the user (e.g., network device $140_1$ of FIG. 1) to storage control logic 270 of the file system situated within the kernel mode 330 of the storage server. The storage control logic 270 performs a state change event (e.g., modifies the file through a write access), and issues the notification message 170 as a return message for the access request message. The presence of the notification message 170 may be detected by the monitoring logic 160 via the API 280. In response, the monitoring logic 160 extracts the object identifier associated with the object undergoing a state change and provides the object identifier to the threat detection system 150 of FIG. 1, which may be used by the threat detection system 150 to retrieve the object.

III. Threat Detection System Architecture

Figure 4:
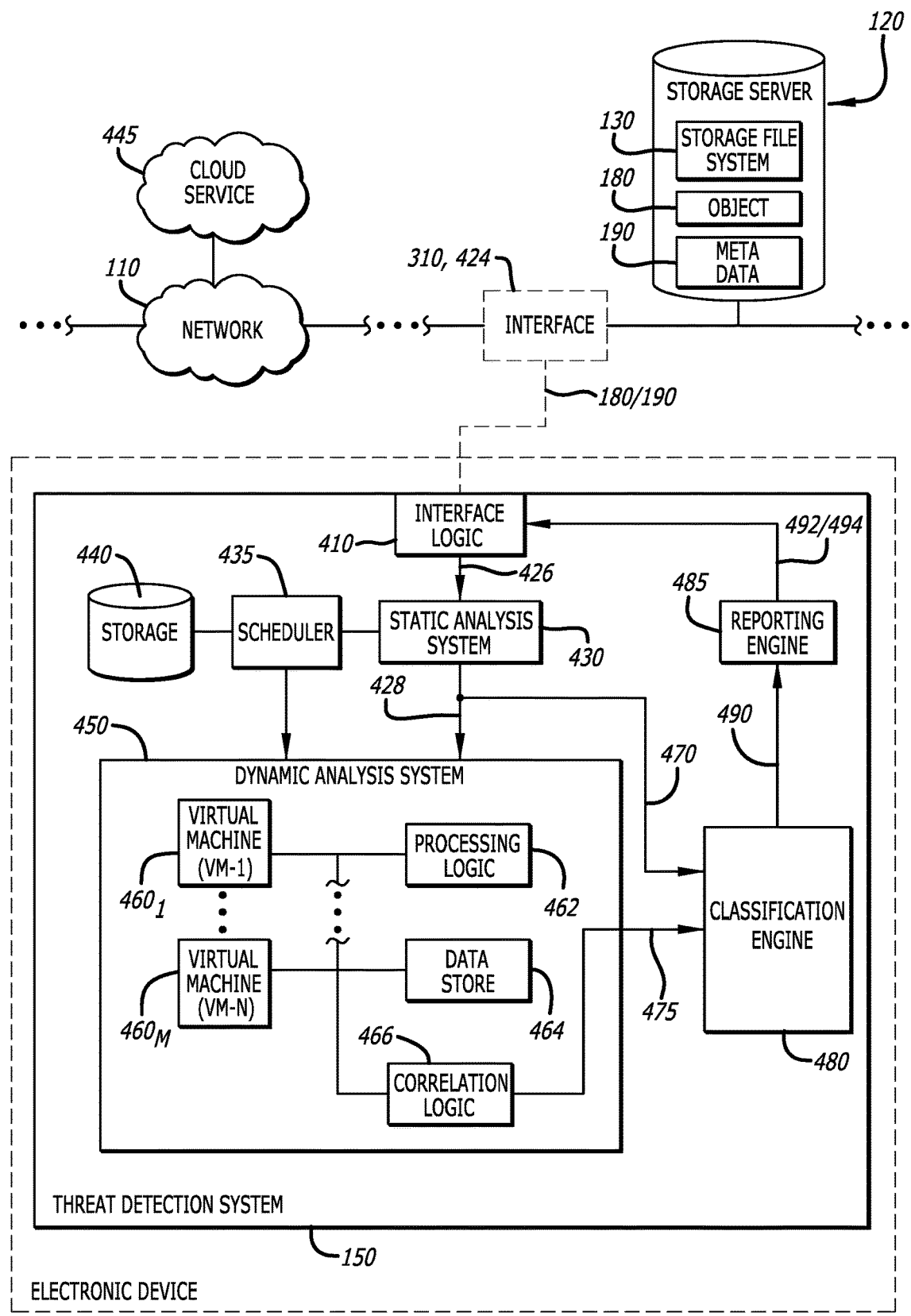
FIG. 4 is an exemplary embodiment of the threat detection system that communicates with monitoring logic deployed within a file system of the storage server of FIG. 2.

Referring to FIG. 4, an exemplary embodiment of the threat detection system 150 that communicates with monitoring logic (e.g., a plug-in) deployed within a file system of the storage server 120 is shown. The threat detection system 150 is adapted to analyze the suspect object 180 associated with file that is newly stored, deleted or stored and modified within the file system 130. According to this illustrative embodiment, the threat detection system 150 may be communicatively coupled with the network 110 via interface logic 410, where the network 110 may operate as a public network such as the Internet or a private network (e.g., a local area network "LAN", wireless LAN, etc.). The interface logic 410 is configured to receive some or all of the data within a detected notification message, most notably the metadata 190 that identifies a storage location of the suspect object 180 within the storage server 120, which is routed to the threat detection system 150. For instance, as an illustrative example, the interface logic 410 may be a data capturing device that automatically (or on command) accesses data stored in a storage system or another type of interface, such as a port, for receiving objects manually provided via a suitable dedicated communication link or from storage media such as a solid-state drive or flash drive.

As shown in FIG. 4, the interface logic 410 operates as a data capturing device that receives incoming data 424, namely the metadata (object identifier) 190 and/or the suspect object 180. Alternatively, the interface logic 410 can be integrated into an intermediary device in the communication path (e.g., an optional firewall, router, switch or other networked electronic device) or may be deployed as a standalone component, such as an appropriate commercially available network tap, as shown.

According to one embodiment of the disclosure, the metadata 190 may be used, at least in part by interface logic 410 when the suspect object 180 is not part of the incoming data 424, to determine if the object identifier, which identifies a storage location of the suspect object 180 in the storage server 120, is provided with the metadata 190. If so, the interface logic 410 initiates communications to fetch the suspect object 180 from the storage server 120. It is contemplated that the metadata 190 may be further used to determine protocols, application types and other information, which may be used by logic within the threat detection system 200 such as a scheduler 435 or other logic such as a virtual machine monitor (not shown) for example, to determine a particular software profile used for virtual machine (VM) configuration and/or VM operation scheduling. As an example, one or more software profiles may be used for initial configuration of guest software of one or more VMs $460_1$-$460_M$ (M≥1) operating within dynamic analysis system 450. Fetched from a storage device 440, these software profile(s) may be directed to different types of applications (e.g., different versions of the same application type, different application types, etc.).

As further shown in FIG. 4, the threat detection system 150 includes the interface logic 410, the static analysis system 430, the scheduler 435, the storage device 440, the dynamic analysis system 450, classification engine 480, and/or reporting engine 485. Herein, according to this embodiment of the disclosure, the interface logic 410 receives data associated with the notification message, including an object identifier. In response to receipt of the object identifier, the interface logic 410 issues a request for the suspect object identified by the object identifier.

In response to receipt of the suspect object 180, the interface logic 410 may be configured to convert that object 180 into a format, if needed or as appropriate, on which scanning may be conducted by the static analysis system 430. This conversion may involve decompression of the object for example. It is contemplated that the interface logic 410 may conduct de-compilation, disassembly or other de-obfuscation activities on the captured object 424 to produce a formatted object 426. However, as shown below, the de-obfuscation and data extraction activities may be handled by logic within the static analysis system 430.

Referring still to FIG. 4, the static analysis system 430 may analyze information associated with the formatted object 426. Such analysis may include, but is not limited or restricted to, an analysis of the object type and may extract one or more characteristics (hereinafter "characteristic(s)") associated with the formatted object 426, such as the object name, object type, size, path, or the like. According to this embodiment of the disclosure, the extracted characteristic(s) may be provided as static analysis (SA)-based results 470 to the classification engine 480 for subsequent analysis. Additionally or in the alternative, the static analysis system 430 may analyze the formatted object 426 itself by performing one or more checks. An example of the check may include one or more signature checks, which may involve a comparison of (i) content of the formatted object 426 and (ii) one or more pre-stored signatures associated with detected malware.

It is contemplated that the static analysis system 430 may further include processing circuitry (not shown) that is responsible for extracting or generating metadata contained within or otherwise associated with formatted object 426 from the interface logic 410. This metadata may be subsequently used by the scheduler 435 for initial configuration of one or more VMs $460_1$-$460_M$ within the dynamic analysis system 450, which conducts run-time processing of at least a portion of the formatted object 426 as described below.

Although not shown, for a multiple VM deployment, a first VM $460_1$ and a second VM $460_2$ may be configured to run concurrently (i.e. at the same time or in an overlapping manner), where each of these VMs may be initially configured with different software profiles. As an alternative embodiment, the first VM $460_1$ may be configured to run multiple processes involving a single type of application instance or multiple types of application instances concurrently or sequentially.

More specifically, after analysis of the formatted object 426 has been completed, the static analysis system 430 may provide at least a portion of the formatted object 426 (hereinafter generally referred to as "suspicious object" 428) to the dynamic analysis system 450 for in-depth dynamic analysis by the VMs $460_1$-$460_M$. For instance, according to one embodiment of the disclosure, a first VM $460_1$ may be adapted to analyze the suspicious object 428, which may constitute the object itself or a file path for accessing the object for example. Although not shown, it is contemplated that the dynamic analysis may be conducted remotely from the threat detection system 150 that is handling the static analysis, such as within a cloud service 445, or any other remotely located source.

According to one embodiment of the disclosure, the dynamic analysis system 450 features one or more VMs $460_1$-$460_M$, where each VM $460_1$, . . . , or $460_M$ processes the suspicious object 428 within a run-time environment. Behavior monitoring logic is configured to be operable with one or more processes running in the VM $460_1$, . . . , or $460_M$, where each process may be associated with a different application instance, to collect behavioral information and, in some embodiments, the behavior monitoring logic can be selectively enabled or disabled.

Illustrated in FIG. 4 as an optional feature, the dynamic analysis system 450 may include processing logic 462 that is configured to provide anticipated signaling to the VM $460_1$-$460_M$ during processing of the suspicious object 428, and as such, represents a source of or destination for communications with the suspicious object 428 while processed within that VM $460_1$, . . . , or $460_M$. As an example, the processing logic 462 may be adapted to operate by providing simulated key inputs from a keyboard, keypad or touch screen or providing certain other signaling without human involvement, as requested by the suspicious object 428 during run-time.

As shown, the dynamic analysis system 450 further comprises a data store 464 and correlation logic 466. The data store 464 may be used to provide local storage for analysis and detection rules as well as operate as a local log for information accessible to the correlation logic 466 for use in determining whether the object 428 is suspicious. This information may be part of the VM-based results 475 described below.

As shown in FIG. 4, the static analysis system 430 may be adapted to provide SA-based results 470 to the classification engine 480 while the dynamic analysis system 450 may be adapted to provide the VM-based results 475 to the classification engine 480. According to one embodiment of the disclosure, the SA-based results 470 may include information associated with the characteristics of the formatted object 426 that are potentially indicative of malware (e.g., source IP address, object size, etc.). Similarly, the VM-based results 475 may include information associated with monitored behaviors of the suspicious object 428 during processing, which may include abnormal or unexpected system or API calls being invoked, abnormal or unexpected memory accesses by one or more processes running in a first VM $460_1$.

According to one embodiment of the disclosure, the classification engine 480 is configured to receive the SA-based results 470 and/or the VM-based results 475. Based at least partially on the SA-based results 470 and/or VM-based results 475, the classification engine 480 evaluates the characteristic(s) within the SA-based results 470 and/or the content associated with the monitored behaviors that is part of the VM-based results 475 to determine whether the suspicious object 428 should be classified as "malicious". This evaluation may be based on data acquired through experiential knowledge or machine learning.

For instance, the classification engine 480 may conduct a probabilistic modeling process that assigns risk levels to different monitored behaviors of the suspicious object 428 being processed within at least a first VM $460_1$. The risk levels may be aggregated to produce a value (e.g., a probability score or risk designation) that denotes whether the suspicious content 428 is malicious (e.g., associated with an exploit attack). Upon determining that the object 428 is associated with a malicious attack, the classification engine 480 may provide information 490 to identify the malicious object, including information that identifies one or more of the monitored behaviors, to the reporting engine 485.

The reporting engine 485 is configured to receive information 490 from the classification engine 480 and generate alert signals 492, especially in response to the suspicious object 428 being now classified as malicious. The alert signals 492 may include various types of messages, which may include text messages, email messages, video or audio stream, or other types of information over a wired or wireless communication path. The reporting engine 485 features an optional user interface (e.g., touch pad, keyed inputs, etc.) for customization as to the reporting configuration. The reporting engine 485 may further generate signaling 494 directed to the storage (file) system via the monitoring logic to identify that the suspect object is malicious and remediate the storage of a malicious object through removal or quarantining that object.

IV. General Operational Flow

Figure 5:
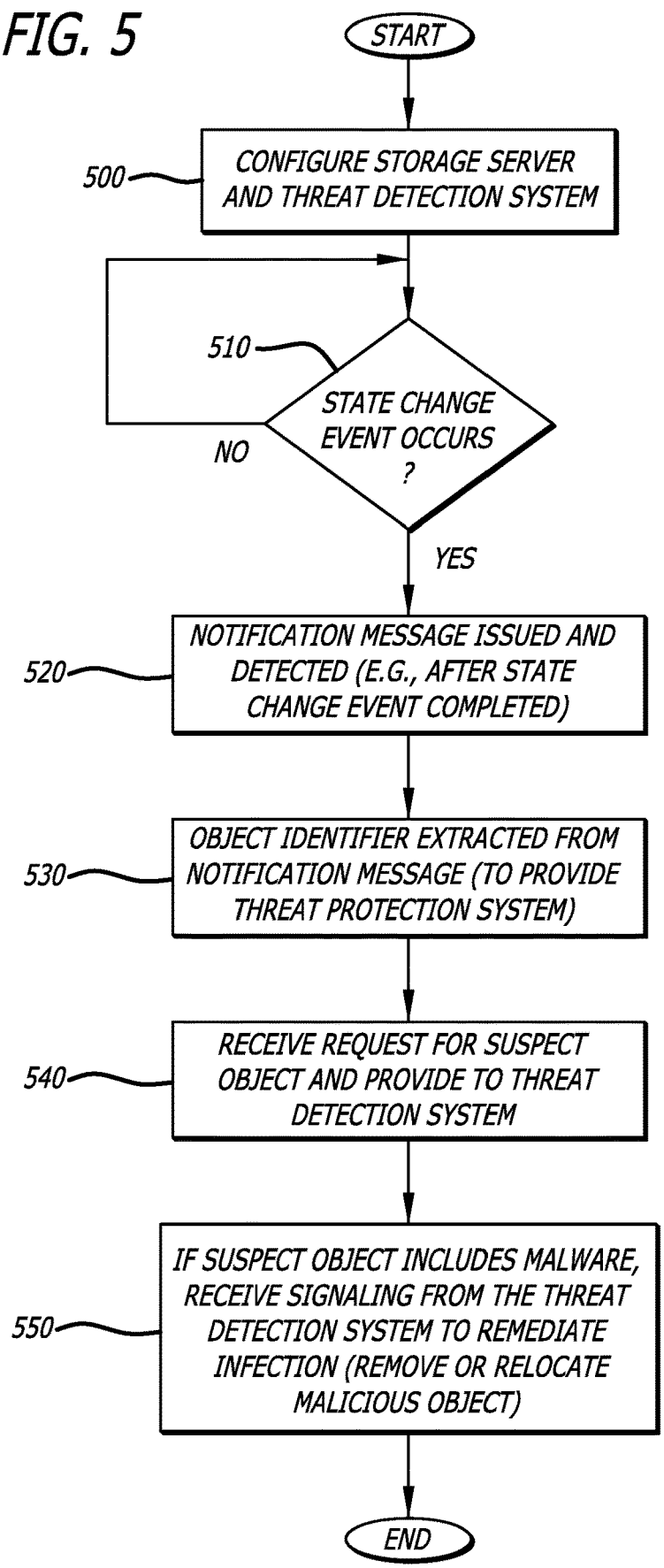
FIG. 5 is an exemplary embodiment of operations conducted during the inter-connectivity between the monitoring logic and the threat detection system of FIGS. 2-4.

Referring to FIG. 5, an exemplary embodiment of operations conducted during the inter-connectivity between the monitoring logic and the threat detection system of FIGS. 2-4 is shown. Initially, the storage server and the threat detection system are configured (block 500). More specifically, according to one embodiment of the disclosure, the monitoring logic (plug-in) is configured to detect certain communications initiated by the storage control logic of the file system. In particular, the monitoring logic may have access to an API that provides accessibility to notification messages issued by the storage control logic within the storage server. According to this embodiment, the notification messages may operate to acknowledge completion of a requested change in state of a stored object, such as an update of a stored file, storage of a new file on the storage server, or the like.

In response to receipt of an access request message from a remotely located network device for stored content within the storage server, followed by a subsequent storage request message, the file system conducts a state change event (writes the updated file on the storage server, creates and writes a new file on the storage server, etc.) as set forth in block 510. Thereafter, the storage control logic issues a notification message that identifies that the object has been altered, which is detected by the monitoring logic (block 520). The monitoring logic extracts an object identifier from the notification message and establishes communications with the threat detection system, if communications have not yet been established (block 530).

Thereafter, the threat detection system may utilize the communication channel to obtain a copy of the stored object (file) for behavioral analysis to determine whether the stored object includes malware (block 540). In response to a determination that the stored object includes malware, the threat detection system may issue signaling to the file system to remediate the infection by quarantine or removal of the malicious suspect object within the data store of the storage server (block 550). This may involve re-locating the malicious suspect object into a certain portion of memory within the data store and substituting the suspect object with a text object. The text object, when accessed by a user through a network device, causes the display of a message that advises the user of the remediation technique conducted and perhaps information to contact an administrator for the storage server.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A non-transitory computer readable medium including software that, when executed by one or more processor, monitors for a triggering event causing a malware analysis to be conducted on an object and performing operations comprising:
an Application Programming Interface (API) provided as an interface to a file system; and
monitoring logic remotely located from the file system, the monitoring logic, when executed by the one or more processors, monitors the API to detect a notification message that is directed to a destination other than the monitoring logic and identifies a state change event representing an activity causing a change in state of a data store associated with the file system to occur, the notification message, at least in part, triggering a malware analysis to be conducted on an object associated with the state change event.

2. The non-transitory computer readable medium of claim 1, wherein the state change event occurs in response to a requested modification of the object stored in the data store of the file system.

3. The non-transitory computer readable medium of claim 1, wherein the state change event occurs in response to a request to store the object into the data store associated with the file system.

4. The non-transitory computer readable medium of claim 1, wherein responsive to detecting the notification message, the triggering of the malware analysis includes extracting an identifier from the notification message, the identifier provides information to identify a storage location of the object in the data store associated with the file system.

5. The non-transitory computer readable medium of claim 4, wherein the identifier includes a file path or a unique name assigned to the object.

6. The non-transitory computer readable medium of claim 1, wherein the triggering of the malware analysis includes recovering the object and conducting a dynamic analysis on the object, the dynamic analysis being conducted by the dynamic analysis system that includes behavior monitoring logic configured to monitor behaviors of one or more virtual machines processing the object recovered from the data store of the file system.

7. The non-transitory computer readable medium of claim 6, wherein the malware analysis further includes conducting a static analysis of the object by a static analysis system, the static analysis includes an analysis of at least one of (i) one or more characteristics associated with the object or (ii) information that is part of the object.

8. The non-transitory computer readable medium of claim 1, wherein the monitoring logic being provided access to storage control logic within the file system via the API to detect the notification message responsive to the state change event being a return message for an access request message, the storage control logic controls storage and retrieval of objects from the file system.

9. The non-transitory computer readable medium of claim 1, wherein the monitoring logic being configured to intercept the notification message where the notification message is directed to a destination other than the monitoring logic.

10. A system comprising:
one or more processors; and
a memory communicatively coupled to the one or more processors, the memory including
a file system including an Application Programming Interface (API) operating as an interface to the file system, and
monitoring logic remotely located from the file system, the monitoring logic, when executed by the one or more processors, monitors the API to detect a notification message that is directed to a destination other than the monitoring logic and identifies a state change event representing an activity causing a change in state of a data store associated with the file system to occur, the notification message, at least in part, triggering a malware analysis to be conducted on an object associated with the state change event.

11. The system of claim 10, wherein the state change event occurs in response to a requested modification of the object stored in the data store of the file system.

12. The system of claim 10, wherein the state change event occurs in response to a request to store the object into the data store associated with the file system.

13. The system of claim 10, wherein responsive to detecting the notification message, the triggering of the malware analysis includes extracting an identifier from the notification message, the identifier provides information to identify a storage location of the object in the data store associated with the file system.

14. The system of claim 13, wherein the identifier includes a file path or a unique name assigned to the object.

15. The system of claim 10, wherein the triggering of the malware analysis includes recovering the object and conducting a dynamic analysis on the object, the dynamic analysis being conducted by the dynamic analysis system that includes behavior monitoring logic configured to monitor behaviors of one or more virtual machines processing the object recovered from the data store of the file system.

16. The system of claim 15, wherein the malware analysis further includes conducting a static analysis of the object by a static analysis system, the static analysis includes an analysis of at least one of (i) one or more characteristics associated with the object or (ii) information that is part of the object.

17. The system of claim 10, wherein the monitoring logic being provided access to storage control logic within the file system via the API to detect the notification message responsive to the state change event being a return message for an access request message, the storage control logic controls storage and retrieval of objects from the file system.

18. The system of claim 10, wherein the monitoring logic being configured to intercept the notification message where the notification message is directed to a destination other than the monitoring logic.

19. A computerized method for monitoring a file system, including an Application Programming Interface (API) operating as an interface, by monitoring logic remotely located from the file system, comprising:
monitoring the API to detect a notification message that is directed to a destination other than the monitoring logic; and
identifying a state change event representing an activity causing a change in state of a data store associated with the file system to occur, wherein the notification message, at least in part, triggering a malware analysis to be conducted on an object associated with the state change event.

20. The computerized method of claim 19, wherein the state change event occurs in response to a requested modification of the object stored in the data store of the file system.

21. The computerized method of claim 19, wherein the state change event occurs in response to a request to store the object into the data store associated with the file system.

22. The computerized method of claim 19, wherein responsive to detecting the notification message, the triggering of the malware analysis includes extracting an identifier from the notification message, the identifier provides information to identify a storage location of the object in the data store associated with the file system.

23. The computerized method of claim 22, wherein the identifier includes a file path or a unique name assigned to the object.

24. The computerized method of claim 19, wherein the triggering of the malware analysis includes recovering the object and conducting a dynamic analysis on the object, the dynamic analysis being conducted by the dynamic analysis system that includes behavior monitoring logic configured to monitor behaviors of one or more virtual machines processing the object recovered from the data store of the file system.

25. The computerized method of claim 24, wherein the malware analysis further includes conducting a static analysis of the object by a static analysis system, the static analysis includes an analysis of at least one of (i) one or more characteristics associated with the object or (ii) information that is part of the object.

26. The computerized method of claim 19, wherein the monitoring logic being provided access to storage control logic within the file system via the API to detect the notification message responsive to the state change event being a return message for an access request message, the storage control logic controls storage and retrieval of objects, including the object, from the file system.

27. The computerized method of claim 19, wherein the monitoring logic being configured to intercept the notification message where the notification message is directed to a destination other than the monitoring logic.

\* \* \* \* \*